UNITED STATES PATENT OFFICE.

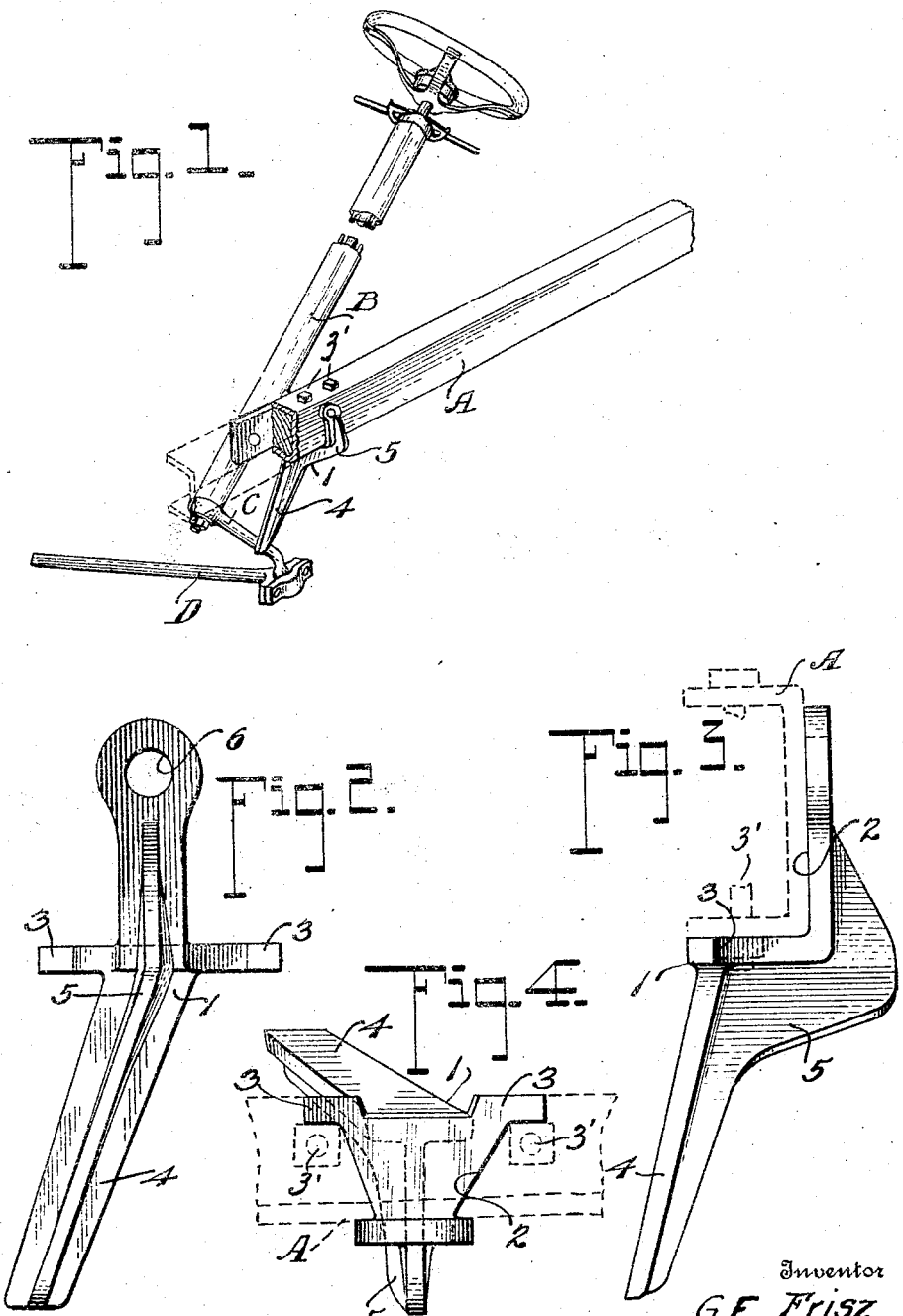

GEORGE E. FRISZ AND JAMES D. WILTSHIRE, OF INDIANAPOLIS, INDIANA.

STOP-ARM FOR STEERING MECHANISM.

1,304,300.  Specification of Letters Patent.  Patented May 20, 1919.

Application filed February 3, 1919. Serial No. 274,656.

*To all whom it may concern:*

Be it known that we, GEORGE E. FRISZ and JAMES D. WILTSHIRE, citizens of the United States, residing at Indianapolis, in the county of Marion and State of Indiana, have invented certain new and useful Improvements in Stop-Arms for Steering Mechanism, of which the following is a specification.

The present invention has for its object to provide, as a new article of manufacture, a safety device for the steering mechanism of a motor vehicle designed to prevent abnormal movement of the steering arm. The device is devised primarily for a well-known make of automobiles, and is so arranged with respect to the steering arm by attachment to the frame of the vehicle, as to act as a stop to limit movement of said arm when the steering wheel is turned in one direction.

It may be explained that the steering arm referred to in this particular type of mechanism is so positioned on the steering wheel shaft as to permit one to turn it in one direction past its extreme operative position or "over center", allowing the cross connecting rod which is connected to the steering mechanism to move back slightly in a reverse direction from that intended, such sudden change of direction imparted to the wheels as a consequence, resulting very often in serious accidents. At other times the steering arm may become locked when it reaches this "over center" position causing the driver to lose control of the machine which not infrequently is overturned. The same result may take place at times when one of the steering wheels of the vehicle meets with an obstruction or drops into a rut into the road, causing a sudden twisting of said steering wheels to the extent of moving the steering arm into this dangerous position above described.

It is to prevent likelihood of this difficulty happening that our article is devised in the form of an arm so shaped as to enable it to be attached to the frame of the car at one side and adjacent to the steering arm, so as to be impinged by the latter when it is turned to its safety limit.

These and such other objects as may hereinafter appear are attained by the novel construction, combination and arrangement of parts to be hereinafter specifically described and claimed. Reference will now be had to the accompanying drawings forming a part of this specification, wherein:

Figure 1 is a fragmentary perspective view showing the application of our invention in operative position;

Fig. 2 is an elevation of the device;

Fig. 3 is a side elevation; and

Fig. 4 is a top plan.

Throughout the following detail description and on the several figures of the drawings, similar parts are referred to by like reference characters.

In the drawing A designates a side of the vehicle frame, B the steering post, and C the steering arm.

The steering arm in this type of vehicle is connected to the steering mechanism for the wheels in the usual manner by the cross connecting rod D.

The invention which is here involved comprises an arm designated 1, the upper portion of which is formed with an L-shaped seat 2 to fit snugly about the side frame piece A. As shown most clearly in Fig. 3, at the base of the seat the device is provided with laterally projecting arms 3, bearing against the under face of the side A for the purpose of giving suitable bearing surface to withstand the strains that may be imparted to the arm during use. The main purpose of these laterally projecting arms, however, is more especially depicted in Fig. 4, where it will be observed that the arms seat between the ends of bolts 3' which extend through the side frame member A and the lateral surface of said side, as shown in dotted lines. Obviously this arrangement of the arms together with the upper fastening member referred to hereafter adequately makes the device rigid and well adapted to resist the strains against its lower end.

At the lower portion, the device is provided with downwardly projecting member 4 which is of sufficient length to extend to a point such that its lower end will lie in the path of possible movement of the steering arm C so as to be impinged thereby just before said arm reaches what we have hereinbefore referred to as the "over center" position. It will be observed by reference to Fig. 2 that to occupy this relative position the extension or depending part 4 inclines at an angle from the vertical. In order to give substantiality to this simple article it is preferably provided with a strengthening rib 5 extending longitudinally from its upper portion to the lower end.

The device is readily attached in position by passing a bolt or similar fastening member through the aperture 6 and into or through the frame piece A as will readily appear to the skilled mechanic.

We have already set forth above a sufficient description of the purpose of this device and how it performs its stop function by limiting the rotative movement of the steering arm C when it is turned in one direction, and no additional description of the same appears to be requisite. It will readily be apparent that the article may be cast in one single piece, may be cheaply manufactured, and readily attached, all of which features are desirable for an article of this character.

Having thus described our invention, what we claim as new is:

1. In combination with a vehicle frame and a steering member mounted thereupon, a stop arm attached to the frame at one end and having its other end positioned in the path of movement of said steering member to limit the extent of possible movement thereof.

2. As a new article of manufacture, a safety device for steering mechanism, comprising a stop arm having a seat at one side thereof to receive the part to which it is attached, and a depending part projecting to a point in the path of movement of the steering arm of the mechanism.

3. As a new article of manufacture, a safety device for steering mechanism, comprising a stop arm having at its upper end a seat to engage about the frame of the vehicle and an aperture affording means for attachment to said frame, lateral projections adjacent said seat providing a substantial bearing surface, an arm depending from the seat portion and of suitable length to extend into the path of possible movement of the vehicle steering arm, and a strengthening rib extending longitudinally from end to end of the device.

In testimony whereof we affix our signatures.

GEORGE E. FRISZ.
JAMES D. WILTSHIRE.

Copies of this patent may be obtained for five cents each, by addressing the "Commissioner of Patents, Washington, D. C."